March 10, 1970     J. L. WENTZEL     3,499,569
HOLLOW STEM FOOTED TUMBLER

Filed Jan. 17, 1968     2 Sheets-Sheet 1

INVENTOR
JAMES L. WENTZEL
BY
ATTORNEY

March 10, 1970   J. L. WENTZEL   3,499,569
HOLLOW STEM FOOTED TUMBLER

Filed Jan. 17, 1968   2 Sheets-Sheet 2

INVENTOR
JAMES L. WENTZEL
BY
ATTORNEY 3,499,569
HOLLOW STEM FOOTED TUMBLER
James L. Wentzel, Cottage Grove, Minn., assignor, by mesne assignments, to Plastics, Inc., St. Paul, Minn., a corporation of Delaware
Filed Jan. 17, 1968, Ser. No. 698,543
Int. Cl. A47g 19/22; B65d 1/00
U.S. Cl. 215—99.5     5 Claims

ABSTRACT OF THE DISCLOSURE

This invention resides in a hollow stem footed tumbler of a general type commonly known as a goblet. The tumbler includes an upper body portion having tapering side walls and a ring-shaped bottom wall connected at its inner edge to the large diameter of a frusto-conical upper stem portion terminating at its small diameter lower end in a partition wall. The glass also includes a second frusto-conical lower stem portion connected at its small diameter upper end to the upper stem portion adjoining the partition wall and includes a generally ring-shaped base preferably terminating in a downwardly extending short peripheral flange.

---

Figure 1:
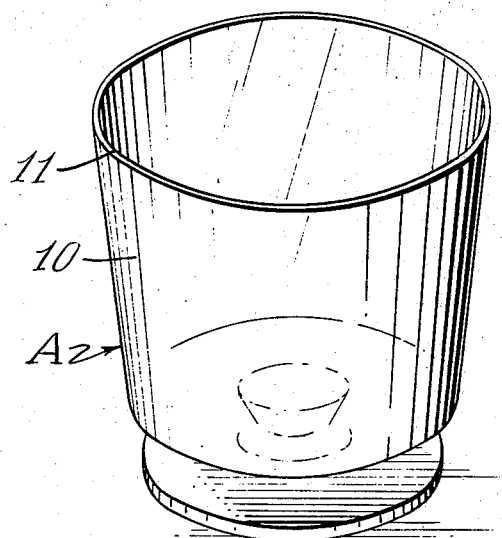

This invention relates to an improvement in thin-walled hollow stem footed tumbler and deals particularly with a form of disposable plastic tumbler.

During the last two or three years, the use of disposable plastic tumblers has greatly increased. Disposable tumblers were originally designed for use on airliners where weight and space are at a premium, and where the glasses are not usually reused during a flight. In the past, where highballs, cocktails, and other beverages were served to the passengers, it was necessary to collect the glasses after use, and place them in a suitable rack or box so that they could be taken from the airplane and washed for reuse. With the increase in size and speed of the airplanes, the task of picking up the glasses after use becomes more and more difficult. At the same time, if the glasses were not properly picked up before landing, there was always the possibility that the glass would drop to the floor and become broken, creating a danger of injury to the passengers. By using disposable tumblers, no particular damage was done in the event the tumblers could not be collected before landing, as disposable plastic tumblers are resilient, and do not easily break.

While tumblers of one type or another have been used in great quantities, it has not been felt practical to produce a disposable tumbler of the goblet type. Goblets differ from ordinary tumblers in having a supporting foot connected to the receptacle by means of a stem. In order to support the body of the tumbler, the stem is normally made of substantial thickness. Having a stem of substantial thickness greatly increases the molding time, as it is necessary for the body of the stem to cool sufficiently so that the glass may be removed from the mold. An object of the present invention resides in the provision of a tumbler of the goblet type which has a uniform wall thickness throughout its entire area. With this arrangement, it is possible to mold the disposable goblet as quickly as any other type of disposable tumbler.

A feature of the present invention resides in the provision of a goblet type tumbler in which the stem is hollow and is formed of wall thickness similar to that of the body of the tumbler and the base thereof. The stem is preferably formed of two substantially frusto-conical sections which are connected at their small diameter ends. A partition wall extends across the stem at this point to complete the bottom of the tumbler.

A further feature of the present invention resides in the fact that the liquid in the glass partially fills the stem, providing a pleasing and unusual appearance.

A further feature of the present invention resides in the manner in which the tumblers are molded. In forming the tumbler, the plastic is injected into the mold from a nozzle extending axially into the stem from the undersurface of the tumbler. As a result, any excess plastic or sprue at the gate of the mold is recessed into the lower portion of the stem where it is not readily visible and where it will not interfere with the use of the tumbler. The necessity for trimming off the excess plastic left by the nozzle may accordingly be eliminated.

A further feature of the present invention resides in the provision of a goblet type tumbler construction where the stem is formed in such a manner as to be of uniform thickness with the remainder of the body, and in which the mold may be easily cooled to increase the speed of the molding operation. By making the stem of two substantially frusto-conical sections, the cooling medium may be readily delivered to a point near the partition wall of the stem, so that the molding cycle need not be delayed while this portion of the product is being cooled.

A further feature of the present invention resides in the provision of the goblet type disposable tumbler in which a series of similar tumblers are stackable or nestable. The base portion of the tumbler is slightly smaller in diameter and the interior diameter of the tumbler at juncture between the side wall and the bottom wall. The base and stem are of just sufficient length so that when one glass is placed upon the other, and the two tumblers are axially aligned, the outer surfaces of the side walls of the upper tumbler are in slightly spaced relation to the inner surfaces of the side walls of the lower tumbler. As a result, the tumblers may be easily unstacked. This feature is of extreme importance, in view of the fact that if the walls of disposable plastic tumblers frictionally engage one another when in nested condition, it is extremely difficult to separate them due to the fact that pressure against the walls of the tumblers tend to deform the walls and cause them to stick together more tightly than before.

These and other objects and novel features of the present invention will be more clearly and fully set forth in the following specification and claims.

Figure 2:
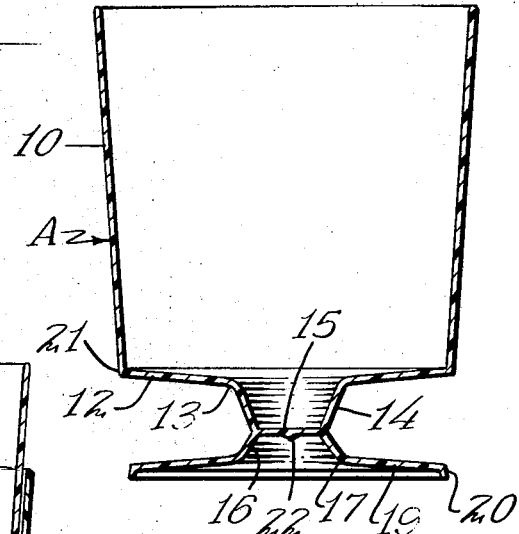
Figure 3:
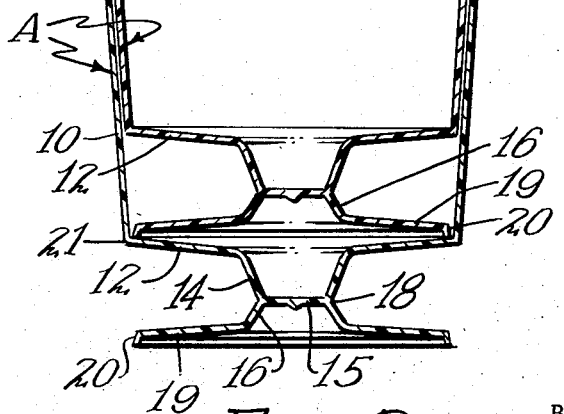
Figure 4:
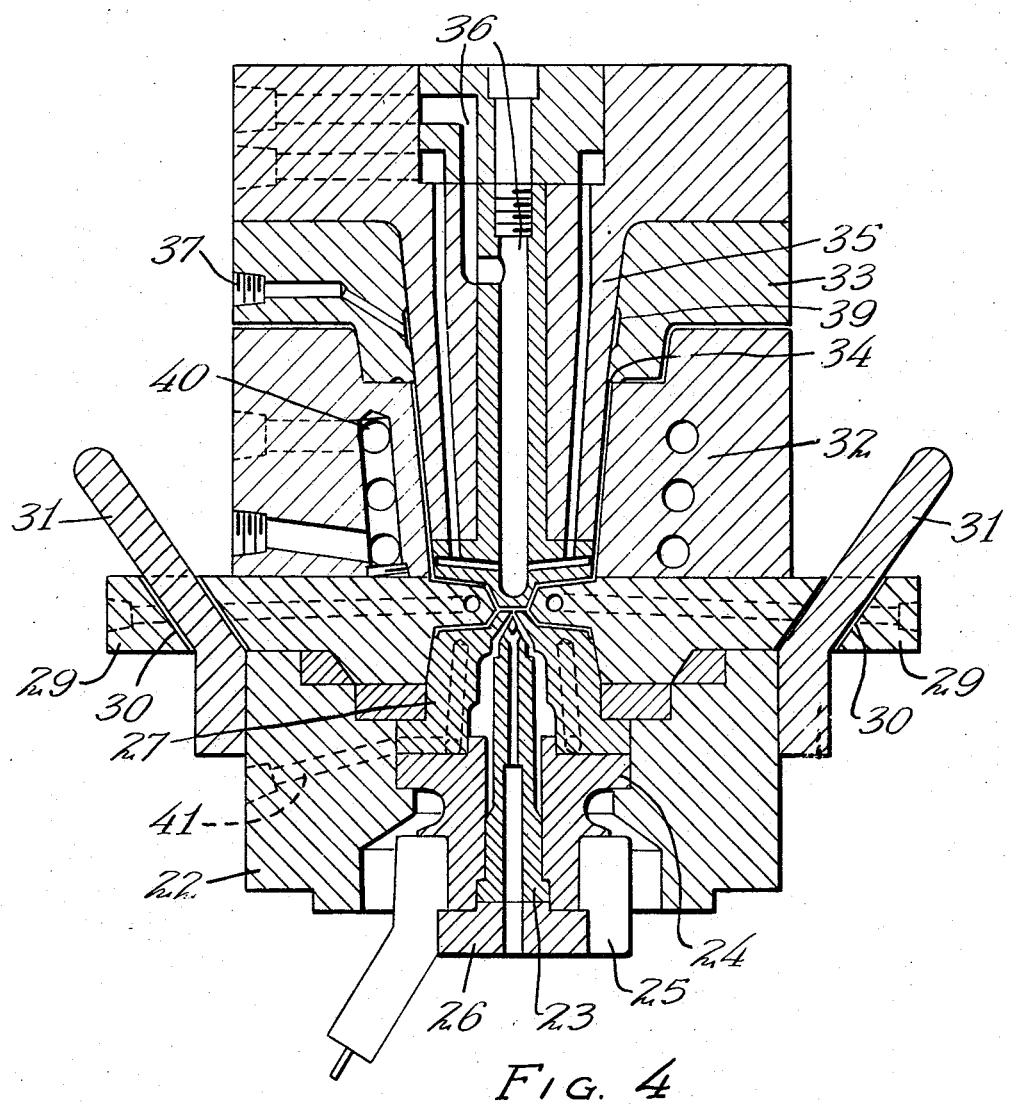

In the drawings forming a part of the specification:
FIGURE 1 is a perspective view of the thin-walled hollow stem tumbler forming a part of the present invention.
FIGURE 2 is a vertical sectional view diametrically through the tumbler of FIGURE 1.
FIGURE 3 is a view similar to FIGURE 2 but showing the manner in which two similar tumblers may nest one within the other.
FIGURE 4 is a diagrammatic view of the mold used in the formation of the tumblers.

The tumbler is indicated in general by the letter A. The tumbler includes a frusto-conical side wall 10 having its upper edge or lip 11 of larger diameter than at the juncture between the side wall and the bottom wall 12. The bottom wall 12 is of ring-shaped form, and its upper surface is slightly concave so that the bottom wall 12 slopes toward the center of the tumbler. The inner edge of the bottom wall 12 is connected at 13 to the large diameter end of a frusto-conical section 14. The lower small diameter end of the frusto-conical portion 14 is closed by a partition wall 15.

The lower edge of the frusto-conical portion 14 is also connected to the smaller diameter end of a frusto-conical portion 16, the larger diameter end of which is connected at 17 to a generally ring-shaped base portion 19. The outer periphery of the base portion 19 is provided with a downwardly extending circular flange 20 which terminates on a single plane normal to the axis of the tumbler. The glass is designed to rest upon the flange 20.

A juncture 18 is provided at the partition wall 15 between the lower end of the upper stem portion 14 and the upper end of the lower stem portion 16.

As is indicated in FIGURE 3 of the drawings, the external diameter of the ring-shaped base portion 19, which has a slightly convex upper surface so that the base slopes toward the periphery thereof, is slightly less than the interior diameter of the side wall 10 at the juncture 21 between the side wall 10 and the bottom wall 12. As a result, the flange 20 of one tumbler may rest solidly upon the bottom wall 12 of a similar tumbler.

It should also be noted that the base and the stem of the tumbler, formed by the joined frusto-conical portions 14 and 16, is just sufficient so that the side wall 1 of one tumbler will be free of contact with the similar wall of another tumbler when the two are nested as indicated in FIGURE 3. This arrangement permits the tumblers to be readily separated, and prevents one glass from wedging frictionally into another when tumblers are in nested relation.

It should also be noted that the sprue or excess plastic left at the completion of the molding operation on the glass is on the undersurface of the partition wall 15, as indicated by the numeral 22. This sprue need not necessarily be removed, as it is recessed into the stem and is essentially hidden when the tumbler is in use.

A mold in which the tumbler is formed is illustrated in FIGURE 4 of the drawings. The base plate 22 is apertured to accommodate the nozzle 23 held in place by the nozzle retainer 24, and encircled by a heater 25 held in place by an injection cap or nozzle backup 26. A logo plug 27 encircles the upper portion of the nozzle 23, and the upper surface of the plug 27 is shaped to form the bottom surface of the tumbler, including the bottom of the flange 20, the undersurface of the base 19, the undersurface of the frusto-conical portion 16, and the partition wall 15. The center of the plug 27 is apertured to form the sprue passage or gate through which the plastic flows into the mold.

The upper surface of the base, the exterior surface of the stem of the tumbler, and the bottom portion of the tumbler body or undersurface of the bottom wall 12 is formed by a pair of opposed slides 29 which are in end-abutting relation, and which are apertured as indicated at 30 to accommodate slide fingers or cams 31 which are secured to the base plate 22.

The outer wall of the tumbler or outer surface of the side wall 10 is formed by a mold cavity section 32 which extends the full height of the tumbler side wall. A stripper ring 33 overlies the mold cavity 32 and includes a shoulder 34 which forms at least a portion of the upper edge of the side wall 10. The mold is completed by the punch or force 35 which forms the inner surface of the side wall 10.

The punch or force is provided with passages 36 designed to accommodate steam for heating or cooling water or other cooling liquid. A stripper ring 33 is provided with an air inlet 37 which leads to a circular manifold 39 on the inner surface of the stripper ring. The mold cavity 32 is similarly provided with cooling passages such as 40, and the logo plug 27 is similarly cooled by cooling liquid flowing through passages 41.

In operation, after the plastic has been injected into the mold, the upper portion of the mold including the slides 29 are lifted upwardly, the slide fingers 31 pulling the slides 29 apart until the bottom portion 19 of the glass A is free of the mold. The slides 29 then stop their upward movement. Shortly thereafter, the mold cavity 32 stops its upward movement, and the tumbler is carried upwardly on the force 35. When the tumbler is free of the mold cavity, the stripper ring 33 stops motion, and air is injected through the passage 37 between the stripper ring and the force to separate the tumbler from the force. The tumbler may be removed and the molding operation repeated.

I claim:
1. A hollow stem footed tumbler including:
   a tumbler body including a peripheral side wall,
   a ring-shaped bottom wall connected to the lower edge of said side wall,
   a frusto-conical upper stem portion connected along its larger diameter end to the inner edge of said bottom wall,
   a partition wall closing the lower small diameter end of said upper stem portion,
   a frusto-conical lower stem portion connected at its upper small diameter end to the lower end of said upper stem portion at the juncture of the partition wall and the upper stem portion,
   a ring-shaped base secured to the larger diameter lower end of said lower stem portion and extending outwardly therefrom, said ring-shaped base being of smaller outer diameter than the inner diameter of said side wall at its juncture with said bottom wall,
   said side wall, bottom walls, stem portions, partition wall and base being of substantially equal thickness throughout.
2. The structure of claim 1 and in which said peripheral side wall flares outwardly and upwardly.
3. The structure of claim 1 and in which said bottom wall slopes inwardly and downwardly toward said upper stem portion.
4. The structure of claim 1 and including a downwardly extending peripheral flange on said base.
5. The structure of claim 1 and in which the undersurface of said partition wall includes a sprue.

References Cited

UNITED STATES PATENTS 1,750,568   3/1930   Carew _____ 248—145.3
3,325,048   6/1967   Edwards.
3,363,820   1/1968   Schilling.

WILLIAM T. DIXSON, Jr., Primary Examiner

U.S. Cl. X.R.

220—97; 248—145.3